May 16, 1967     A. R. BOOKER     3,320,355

HEAT SHRINKABLE CONNECTOR FOR ELECTRICAL WIRE

Filed Sept. 7, 1965

INVENTOR
AYLWIN R. BOOKER
BY HIS ATTORNEYS
HARRIS, KIECH, RUSSELL & KERN

United States Patent Office 3,320,355
Patented May 16, 1967

3,320,355
HEAT SHRINKABLE CONNECTOR FOR ELECTRICAL WIRE
Aylwin R. Booker, 4887 Palo Drive,
Tarzana, Calif. 91356
Filed Sept. 7, 1965, Ser. No. 485,217
7 Claims. (Cl. 174—84)

ABSTRACT OF THE DISCLOSURE

A sleeve of heat shrinkable plastic insulation with a plurality of metallic clamp members disposed about the inner surface of the sleeve for receiving wires to be connected. The connection is obtained by heating the sleeve to shrink the sleeve and compress the clamp members against the wires.

---

This invention relates to wire connectors and to a method of connecting wires. It is an object of the invention to provide a new and improved device which can be utilized to obtain an electrical connection between wires and to obtain a mechanical connection between the wires and to obtain a seal which insulates the connection and protects the connection against moisture and dirt.

It is an object of the invention to provide such a connector which is simple, inexpensive, convenient and reliable. A further object of the invention is to provide a method of joining wires which will produce the desired electrical and mechanical connections and the sealing.

The invention contemplates the use of heat shrinkable plastic insulation material of the type presently on the market, typically a predilated heat shrinkable polyvinyl tubing.

It is a particular object of the invention to provide a method of joining wires including the steps of inserting the ends of at least two wires into the clamping members in a sleeve of heat shrinkable plastic insulation, and thereafter heating the sleeve thus shrinking the plastic about the wires and clamping members providing a seal about the wires spaced from the ends thereof and providing a force compressing the clamping members against the wire ends. A further object is to provide such a method which may be utilized for joining wires in end-to-end relation and for joining wires in side-by-side relation.

It is an object of the invention to provide a connector for electrically and mechanically joining wires and having a sleeve of heat shrinkable plastic insulation and a plurality of metallic clamp members disposed about the inner surface of the sleeve in spaced relation with each other for receiving the wires to be connected so that application of heat produces shrinkage of the sleeve about the wires and clamp members compressing the clamp members against the wires.

The invention also comprises novel details of construction and novel combinations and arrangements of parts, which will more fully appear in the course of the following description. The drawing merely shows and the description merely describes preferred embodiments of the present invention which are given by way of illustration or example.

Figure 1:
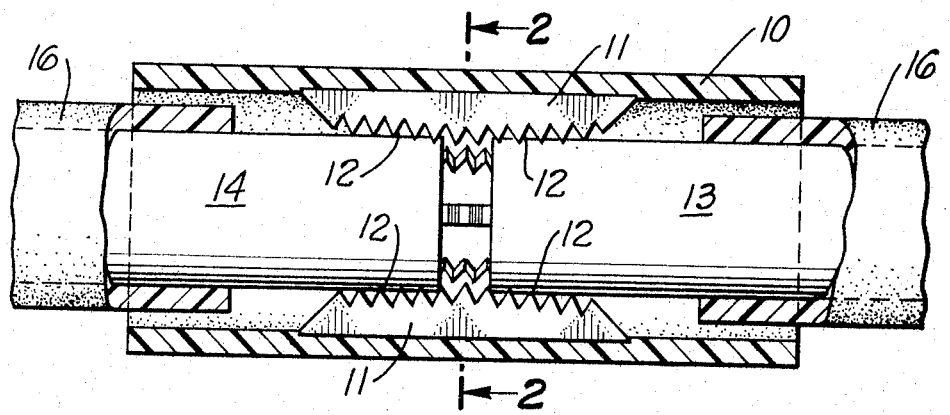
FIG. 1 is a longitudinal sectional view of an end-to-end connector embodying the present invention.
Figure 2:
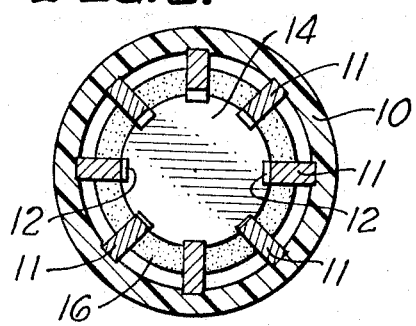
FIG. 2 is a sectional view taken along the line 2—2 of FIG. 1.

The connector of FIGS. 1 and 2 includes a sleeve 10 open at both ends and formed of a heat shrinkable plastic material. A plurality of clamping members 11 is positioned within the sleeve 10 with the members spaced about the inner surface of the sleeve. The clamping members 11 are formed of metal, typically brass or steel, and preferably have tapered serrated surfaces 12 for engaging wires 13, 14 which are to be joined by the connector. The wire engaging surfaces 12 taper away from a sleeve end and toward the longitudinal axis of the sleeve providing a converging opening for receiving a wire end. With the double-ended connector of FIG. 1, the wire receiving openings formed by the members 11 converge from both ends of the sleeve toward the center.

In the preferred embodiment illustrated herein, the serrated teeth on the clamping members 11 are formed so as to provide an interrupted thread (see FIG. 2) so that a connector can be tightened onto a wire by relative rotation of the two parts. It is preferred to have the thread for one end of the connector a right-hand thread and the thread for the other end of the connector a left-hand thread so that the connector can be tightened onto two wires simultaneously by rotation of the connector relative to the two stationary wires.

The connector of FIGS. 1 and 2 is used by first inserting a wire into each end of the connector. Ordinarily each of the wires 13, 14 will have an insulating coating 16 with a portion of the coating removed to provide a bare end. It is preferred to have the insulating coating 16 project into the sleeve 10, as illustrated in FIG. 1. The wires may then be tightened in the connector by rotating the connector relative to the wires.

Figure 3:
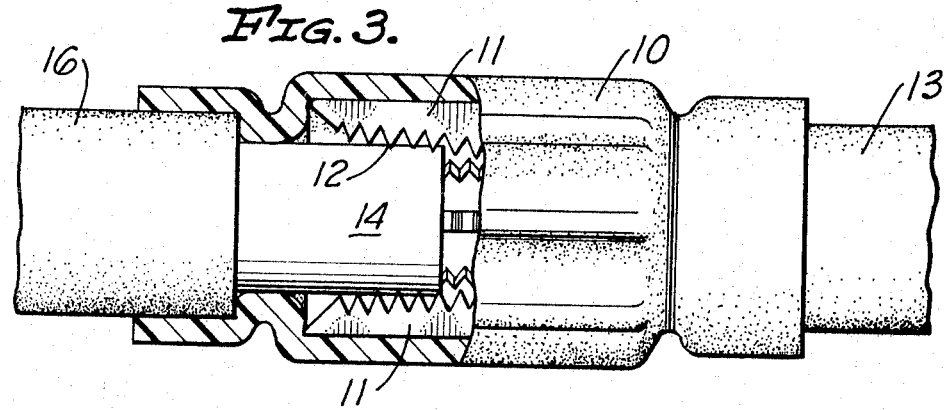
FIG. 3 is a view similar to that of FIG. 1 showing the completed connection.

In the next step, the sleeve 10 is heated as by means of a mild flame or a heated electrode or the like. The particular temperature and time for heating will depend upon the characteristics of the particular heat shrinkable material utilized. Typically heating for about fifteen seconds will be adequate to produce the desired shrinkage of the sleeve about the clamping members and wires, as illustrated in FIG. 3. The shrinkage of the sleeve compresses the clamping members 11 against the wires 13, 14. Shrinkage of the sleeve also closes the gap between the sleeve and the wires at the ends of the sleeve. The shrinkage provides an electrical connection between the wires and provides a mechanical grip for joining the wires and provides a seal about the wires which protects the connections against moisture and dirt. It should be noted that the wires do not necessarily have to be a force fit into the connector prior to shrinkage and that the entire mechanical clamping force can be achieved by shrinking the sleeve.

Figure 5:
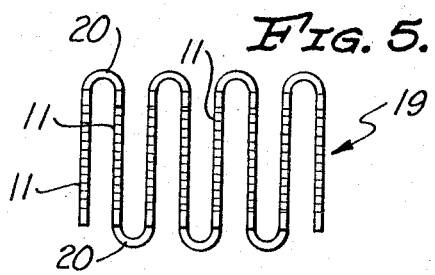
FIG. 5 is a plan view illustrating one arrangement of the clamping members.

One arrangement for forming the clamping members 11 is illustrated in FIG. 5. An elongate strip of metal indicated generally at 19 may be formed as by stamping or punching. The strip will incorporate a plurality of the clamping members 11 joined by relatively thin and flexible linking members 20. The elongate strip is then bent into the serpentine pattern of FIG. 5. The serpentine structure is then rolled into the cylindrical structure as illustrated in FIGS. 1 and 2. The cylindrical structure may be formed on an expandable mandrel permitting positioning of the cylindrical structure into the sleeve 10, after which the mandrel is expanded slightly while the sleeve is heated slightly to set the clamping member structure in the inner surface of the sleeve. The mandrel is then reduced and withdrawn leaving the clamping members in place. The linking members 20 are thin and flexible and do not affect the subsequent use of the connector.

Figure 4:
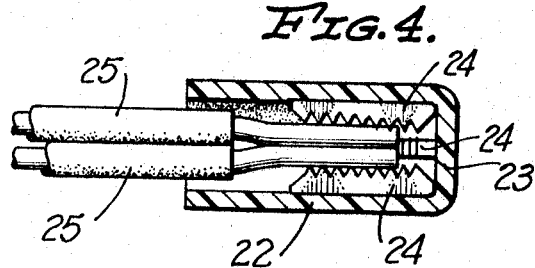
FIG. 4 is a longitudinal sectional view of a side-by-side embodiment of the connector of the invention.

An alternative form of the connector suitable for joining wires in side-by-side relation is illustrated in FIG. 4. A sleeve 22 of heat shrinkable plastic may have a closed end 23. A plurality of clamping members 24 is positioned within the sleeve in the same manner as described in conjunction with the embodiment of FIG. 1. Since the wires are to be inserted from one end only, the clamping members may have only a single taper as illustrated in FIG. 4. Two or more wires 25 are inserted into the sleeve and the connector may be rotated relative to the wires to provide a better grip. Heat is then applied to the connector for shrinking the connector about the clamping members and wires for the purpose of compressing the clamping members against the wires and for the purpose of sealing the sleeve around the wires at a location spaced from the wire ends and preferably at the wire insulation.

A single size connector may be used with several different wire sizes. The magnitude of shrinkage which occurs in the sleeve is a function of the duration and temperature of the heating. If desired, a connector designed to accept a particular wire size may be partially shrunk before any wire is inserted, to reduce the size of the connector to correspond to a smaller wire size. This provides a connector that is adjustable to several wire sizes.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a connector for electrically and mechanically joining two or more wires, the combination of:
   a sleeve of heat shrinkable plastic insulation; and
   a plurality of metallic clamp members disposed about the inner surface of said sleeve in spaced relation with each other for receiving at least two wires to be connected, so that application of heat produces shrinkage of said sleeve about the wires and clamp members compressing said clamp members against the wires.

2. In a connector for electrically and mechanically joining a pair of wires, the combination of:
   a sleeve of heat shrinkable plastic insulation open at each end; and
   a plurality of metallic clamp members disposed about the inner surface of said sleeve in spaced relation with each other and centrally located from said end for receiving a wire inserted through each end, so that application of heat produces shrinkage of said sleeve about the wires and clamp members compressing said clamp members against the wires.

3. In a connector for electrically and mechanically joining two or more wires, the combination of:
   a sleeve of heat shrinkable plastic insulation having an open end and a closed end; and
   a plurality of metallic clamp members disposed about the inner surface of said sleeve in spaced relation with each other for receving through said open end at least two wires to be connected, so that application of heat produces shrinkage of said sleeve about the wires and clamp members compressing said clamp members against the wires.

4. A connector as defined in claim 1 in which each of said clamp members has a wire engaging surface tapering away from an end of said sleeve and toward the axis of said sleeve.

5. A connector as defined in claim 1 in which each of said clamp members has a wire engaging surface tapering away from an end of said sleeve and toward the axis of said sleeve with teeth formed in said surfaces and with said teeth providing an interrupted converging thread in said connector.

6. A connector as defined in claim 1 in which said clamp members are formed in a unitary piece with connecting links between members permitting movement of one member relative to another.

7. In a connector for electrically and mechanically joining a pair of insulated wires having bare ends, the combination of:
   a sleeve of heat shrinkable plastic insulation open at each end; and
   a plurality of metallic clamp members disposed about the inner surface of said sleeve in spaced relation with each other for receiving the bare end of a wire inserted through each end of said sleeve.
   each of said clamp members having a wire engaging surface tapering from each end thereof toward the axis of said sleeve with teeth formed in said surfaces providing interrupted converging threads from each end thereof, one right-handed and one left-handed, so that application of heat produces shrinkage of said sleeve about the wires and clamp members compressing said clamp members against the bare wire ends.

References Cited by the Examiner

UNITED STATES PATENTS 3,035,113   5/1962   Danchuk.
3,243,211   3/1966   Wetmore _____ 174—84 X LEWIS H. MYERS, *Primary Examiner.*

D. L. CLAY, *Assistant Examiner.*

Notice of Adverse Decision in Interference

In Interference No. 96,432 involving Patent No. 3,320,355, A. R. Booker, HEAT SHRINKABLE CONNECTOR FOR ELECTRICAL WIRE, final judgment adverse to the patentee was rendered Sept. 22, 1970, as to claims 1 and 3.

[*Official Gazette February 16, 1971*].